(12) United States Patent
Beier et al.

(10) Patent No.: US 10,346,398 B2
(45) Date of Patent: Jul. 9, 2019

(54) GROUPING IN ANALYTICAL DATABASES (71) Applicant: International Business Machines Corporation, Armonk, NY (US)

(72) Inventors: Felix O. Beier, Holzgerlingen (DE); Andreas Brodt, Gerlingen (DE); Oliver Schiller, Dettingen/Teck (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 295 days.

(21) Appl. No.: 15/452,303

(22) Filed: Mar. 7, 2017

(65) Prior Publication Data

US 2018/0260439 A1 Sep. 13, 2018

(51) Int. Cl.
*G06F 16/00* (2019.01)
*G06F 16/2453* (2019.01)
*G06F 16/951* (2019.01)
*G06F 16/22* (2019.01)
*G06F 16/242* (2019.01)

(52) U.S. Cl.
CPC .... *G06F 16/24542* (2019.01); *G06F 16/2282* (2019.01); *G06F 16/244* (2019.01); *G06F 16/951* (2019.01)

(58) Field of Classification Search
CPC ............. G06F 16/2228; G06F 16/2282; G06F 16/244; G06F 16/24542
See application file for complete search history.

(56) References Cited

U.S. PATENT DOCUMENTS

| 6,163,774 | A  | * | 12/2000 | Lore | ............ | G06Q 10/06 |
| | | | | | | 705/36 R |
| 6,757,670 | B1 | * | 6/2004 | Inohara | ............ | G06F 16/24553 |
| 6,865,567 | B1 | * | 3/2005 | Oommen | ............ | G06F 16/2462 |
| 8,010,554 | B1 | * | 8/2011 | Zhou | ............ | G06F 16/2477 |
| | | | | | | 707/769 |

(Continued)

OTHER PUBLICATIONS

Author Unknown, Oracle database data warehousing guide, 12c release 1 (12.1), Webpage: Oracle Help Center, Jul. 2014, pp. 1-25, Oracle Corporation, Published at: http://docs.oracle.com/database/121/DWHSG/zone_maps.htm.

(Continued)

*Primary Examiner* — Merilyn P Nguyen
(74) *Attorney, Agent, or Firm* — Lee Law, PLLC; Christoper B. Lee (57) ABSTRACT

Attribute value information on data blocks, of a data table with multiple data blocks, is provided that indicates upper and lower bounds of extreme values for at least one attribute of the data table. In response to determining that processing of a received data table query involves grouping of records with respect to a grouping attribute, it is determined whether the attribute value information reflects upper and lower bounds of extreme values of the grouping attribute. If the attribute value information indicates the upper and lower bounds of extreme values of the grouping attribute, a scan list is determined that defines which data blocks of the data table are to be scanned and a scan order is determined. A set of distinct value ranges of the grouping attribute is determined based on the scan order, the data blocks are scanned using the scan list, and the query is processed.

14 Claims, 6 Drawing Sheets

(56) References Cited

U.S. PATENT DOCUMENTS

| | | | | |
|---|---|---|---|---|
| 8,126,870 | B2* | 2/2012 | Chowdhuri | G06F 16/24532 707/713 |
| 8,762,407 | B2* | 6/2014 | Wang | G06F 16/283 707/769 |
| 9,015,572 | B2 | 4/2015 | Lanza et al. | |
| 9,600,578 | B1* | 3/2017 | Sacco | G06F 16/2228 |
| 2004/0117359 | A1* | 6/2004 | Snodgrass | G06F 16/2477 |
| 2009/0006346 | A1* | 1/2009 | C N | G06F 16/24542 |
| 2013/0275365 | A1* | 10/2013 | Wang | G06F 16/283 707/602 |
| 2014/0095502 | A1 | 4/2014 | Ziauddin et al. | |
| 2014/0214886 | A1* | 7/2014 | Annapragada | G06F 16/90335 707/769 |
| 2015/0088812 | A1 | 3/2015 | Ziauddin et al. | |
| 2015/0286681 | A1 | 10/2015 | Baer et al. | |
| 2015/0347492 | A1 | 12/2015 | Dickie | |
| 2016/0196302 | A1 | 7/2016 | Beavin et al. | |
| 2017/0277752 | A1* | 9/2017 | Oyamada | G06F 7/08 |
| 2018/0246950 | A1* | 8/2018 | Arye | G06F 16/24554 |

OTHER PUBLICATIONS

Stephan Baumann, et al., Query processing of pre-partitioned data using sandwich operators, In Proceedings of 6th International Workshop on Business Intelligence for the Real Time Enterprise (BIRTE), Enabling Real-Time Business Intelligence, Aug. 2012, pp. 76-92, Springer Berlin Heidelberg, Published at: http://www.dbis.prakinf.tu-ilmenau.de/publications/files/DBIS:BaBoSa12.pdf.

Naresh Chainani, et al., Db2 with BLU Acceleration: A rapid adoption guide, May 7, 2015, pp. 1-15, IBM Corporation, Published at: http://www.ibm.com/developerworks/data/library/techarticle/dm-1309db2bluaccel/.

Whei-Jen Chen, et al., Database Partitioning, Table Partitioning, and MDC for DB2 9, IBM Redbooks, Aug. 2007, pp. 1-270, IBM Corporation, New York, USA.

Goetz Graefe, Partitioned B-tree—a user's guide, 2003, pp. 668-671, Microsoft Corporation, Published at: http://doesen0.informatik.uni-leipzig.de/proceedings/paper/IP11.pdf.

Tony Morales, et al., Oracle Database: VLDB and Partitioning Guide 11g Release 1 (11.1), Jul. 2007, pp. 1-216, Oracle Corporation, Published at: https://docs.oracle.com/cd/B28359_01/server.111/b32024.pdf.

Sriram Padmanabhan, et al., Multi-Dimensional Clustering: A New Data Layout Scheme in DB2, In Proceedings of the 2003 ACM SIGMOD International Conference on Management of Data, Jun. 9-12, 2003, pp. 637-641, Association for Computing Machinery, New York, NY, USA, Published at: http://doi.acm.org/10.1145/872757.872835.

Mike Stonebraker, et al., C-store: A Column-oriented DBMS, In Proceedings of the 31st International Conference on Very Large Data Bases, Aug. 30, 2005, pp. 553-564, VLDB Endowment, Published at: https://cs.brown.edu/courses/cs227/archives/2008/mitchpapers/required4.pdf.

N. Bayliss, Optimizing Table Scans With Zone Maps, Webpage/blog, Nov. 11, 2014, pp. 1-9, Oracle Corporation, Published at: https://blogs.oracle.com/datawarehousing/entry/optimizing_table_scans_with_zone.

Authors Unknown, IBM PureData-Netezza Developer Network (NDN), Webpage/blog, May 22, 2014, pp. 1-3, IBM Corporation, Published at: https://www.ibm.com/developerworks/community/blogs/Wce085e09749a_4650_a064_bb3f3b738fa3/entry/understanding_netezza_zone_maps?lang=en.

* cited by examiner

GROUPING IN ANALYTICAL DATABASES

BACKGROUND

The present invention relates to the field of digital computer systems, and more specifically, to a method for grouping records of a data table.

Analytical database systems manage very large amounts of data and are optimized for queries that must read large portions of it. At the same time, they for example offer the complete querying power of SQL. A typical and essential operation in analytical workloads is grouping. Instead of looking at individual rows analytical workloads often group many rows together and compute an aggregate on the groups. However, there is a continuous need to improve and optimize the processing of the grouping.

SUMMARY

Various embodiments provide a method for grouping records of a data table, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer-implemented method for grouping records of a data table, the data table being stored on multiple data blocks. The method comprises: providing attribute value information on the data blocks, the attribute value information indicating upper and lower bounds of extreme values for at least one attribute of the data table; receiving, via a network interface card, a query against the data table; determining that processing of the query involves grouping of the records of the data table with respect to a grouping attribute; in response to determining that the processing of the query involves the grouping of the records, determining whether the attribute value information reflects the upper and lower bounds of the extreme values of the grouping attribute; in response to determining that the attribute value information indicates the upper and lower bounds of the extreme values of the grouping attribute, determining a scan list defining which data blocks of the data table are to be scanned and determining an associated scan order; determining a set of distinct value ranges of the grouping attribute based on the scan order of the data blocks, each distinct value range having an associated scan position indicative of a data block in the scan order after which no further data records involving attribute values of the grouping attribute within the respective value range are encountered; and scanning the data blocks in accordance with the scan list and processing the query according to a query execution plan, where the processing of the query involves, in response to reaching a scan position: calculating aggregates on scanned records of the respective distinct value range associated with the scan position; and flushing results relating to the respective distinct value range to subsequent operators in the query execution plan.

In another aspect, the invention relates to a computer program product for grouping records of a data table, the data table being stored on multiple data blocks, comprising a computer readable storage medium having computer readable program code embodied therewith, where the computer readable program code when executed on a computer causes the computer to: provide attribute value information on the data blocks, the attribute value information indicating upper and lower bounds of extreme values for at least one attribute of the data table; receive a query against the data table; determine that processing of the query involves grouping of the records of the data table with respect to a grouping attribute; in response to determining that the processing of the query involves the grouping of the records, determine whether the attribute value information reflects the upper and lower bounds of the extreme values of the grouping attribute; in response to determining that the attribute value information indicates the upper and lower bounds of the extreme values of the grouping attribute, determine a scan list defining which data blocks of the data table are to be scanned and determine an associated scan order; determine a set of distinct value ranges of the grouping attribute based on the scan order of the data blocks, each distinct value range having an associated scan position indicative of a data block in the scan order after which no further data records involving attribute values of the grouping attribute within the respective value range are encountered; and scan the data blocks in accordance with the scan list and process the query according to a query execution plan, where the processing of the query involves, in response to reaching a scan position: calculating aggregates on scanned records of the respective distinct value range associated with the scan position; and flushing results relating to the respective distinct value range to subsequent operators in the query execution plan.

In another aspect, the invention relates to a computer system for grouping records of a data table, comprising: at least one memory that stores the data table on multiple data blocks; a network interface card; and at least one processor programmed to: provide attribute value information on the data blocks, the attribute value information indicating upper and lower bounds of extreme values for at least one attribute of the data table; receive, via the network interface card, a query against the data table; determine that processing of the query involves grouping of the records of the data table with respect to a grouping attribute; in response to determining that the processing of the query involves the grouping of the records, determine whether the attribute value information reflects the upper and lower bounds of the extreme values of the grouping attribute; in response to determining that the attribute value information indicates the upper and lower bounds of the extreme values of the grouping attribute, determine a scan list defining which data blocks of the data table are to be scanned and determine an associated scan order; determine a set of distinct value ranges of the grouping attribute based on the scan order of the data blocks, each distinct value range having an associated scan position indicative of a data block in the scan order after which no further data records involving attribute values of the grouping attribute within the respective value range are encountered; and scan the data blocks in accordance with the scan list and process the query according to a query execution plan, where the processing of the query involves, in response to reaching a scan position: calculating aggregates on scanned records of the respective distinct value range associated with the scan position; and flushing results relating to the respective distinct value range to subsequent operators in the query execution plan.

BRIEF DESCRIPTION OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The attribute value information may indicate the minimum and maximum values of one or more attributes. The minimum and maximum values of an attribute may be guaranteed lower and upper bounds, as usually the minimum and maximum values are exact extreme values when they are determined but later changes in the data may cause them to be just guaranteed lower/upper bounds. Using the attribute value information, a preselection of data blocks of the data table may be performed before scanning the preselected data blocks. The attribute value information may comprise information or metadata on an attribute that allows such a preselection. For example, the maximum and the minimum attribute values of the attribute define a first range of values of the attribute in a respective data block. For example, a received data query may require a second range of values of the attribute. The processing of the data query may comprise selecting data blocks of the data table whose respective first range overlap with the second range and processing those selected data blocks (that forms a scan list).

The attribute value information of a data block may be stored as an entry in the computer system.

The grouping is used to group records of a data tables into subsets that have matching values for one or more attribute. For example, " . . . group by Age" will generate or output groups having the same value for Age. The grouping may be performed by a corresponding grouping operator of a query. The grouping operator may for example comprise a group-by clause expression which forms portions of a query. The grouping may be used in conjunction with aggregates or aggregation functions. The term "aggregation function" or "aggregates" as used herein refers to a function where the values of multiple rows are grouped together as input on certain criteria to form a single value of more significant meaning or measurement. Examples of aggregate functions include: Average( )(i.e., arithmetic mean); Count( ) Maximum( ); nanmean( ) (mean ignoring NaN values, also known as "nil" or "null"); Median( ); Minimum( ); Mode( ); Sum( ). The grouping operator may require and may be assigned a respective buffer or working memory in order to temporally store data required for performing the grouping and the aggregation. The flushing comprises deleting the temporally store data of the working memory.

To reduce the amount of working memory required for a grouping operation, the knowledge about the value ranges of data blocks that is available may be exploited. Once the scan list has been computed, i. e., the set of data blocks that will be scanned by a particular query and the order in which they will be scanned. Provided that all data blocks have an entry of the attribute value information, this information can be inverted such that it reports the value ranges that have been completely dealt with at any given scan position during the scan of the data blocks. If the rows or records read by the scan are grouped by a given attribute, then the grouping implementation can finish up all groups that lie within such a value range for the current scan position. The working memory used for these groups can be freed and/or reused for groups in other value ranges that are yet to come. Consequently, by exploiting the attribute value information, the system may know at a certain point in time which groups will still receive additional rows and which groups have already been completely processed or built.

There are numerous ways to execute the grouping such as hashing and sorting. However, grouping rows through sorting usually requires a large fraction of the rows (if not all) to be sorted before individual groups can be created. This requires a lot of working memory. Another problem, with grouping in general and even more so with hash-based grouping is that it requires a lot of working memory if the number of distinct groups is large. Hash grouping creates a hash table entry for every group. Thus, the hash table becomes large for many groups. The amount of required working memory further increases when aggregates such as MEDIAN are used. Such aggregates require that all rows pertaining to a group to be present in the working memory. The hash table must be kept around until all input rows have been processed. Only then the resulting groups are completely known and these aggregates can be computed and passed to following operators in the query plan. This leads to large groupings that exceed the available working memory. This sometimes reaches the point that executing certain queries may not be possible. The present method may solve these problems. The present method may require as little working memory and buffering as possible, which may also be in the interest of latency until the first query results can be returned. In order to reduce the amount of working memory required for a grouping operation it would be desirable if the system "knows" at a certain point in time which groups will still receive additional rows and which ones don't.

For example, upon receiving the query, a query execution plan of the computer system may generate or create the execution plan for the received query. The execution plan may for example indicate the operators of the query and the way they can be executed.

According to one embodiment, determining the set of distinct value ranges and the scanning of the data blocks comprises iteratively performing: scanning a current data block in accordance with the scan order; comparing the range of values of the grouping attribute of the current data block with ranges of values of the grouping attribute of the not-yet-scanned data blocks of the scan list; in response to determining that at least part of the range of values of the grouping attribute of the current data block is not overlapping with any of ranges of values of the grouping attribute of the not-yet-scanned data blocks of the scan list, performing the processing of the query, wherein the at least part of the range of values of the grouping attribute of the current data block is the distinct value range associated with a scan position.

According to one embodiment, the comparing of the range values comprises: in case the values ranges of the not-yet-scanned data blocks are growing (increasing) or declining (decreasing) value ranges in accordance with the scan order, comparing only the minimum value or the maximum value of the range of values of the grouping attribute the not-yet-scanned data blocks of the scan list with the range of values of the grouping attribute of the current data block.

A trend to grow or to decline may be determined either by examining the value distribution of the grouping attribute or by utilizing meta information such as a GENERATED ALWAYS DML clause when the corresponding table has been created. Once such a trend to grow or decline is detected, only either the minimum (in case of increasing trends) or maximum (in case of decreasing trends) of the remaining value range may be relevant. Thus, if the data blocks in the scan list are known to have growing (increasing) or declining (decreasing) value ranges, then it is sufficient to consider only the minimum value or maximum value of the remaining data blocks in order to detect groups that can be completed. This may minimize overheads for computing the range of possible values of the grouping attribute in not-yet-scanned data blocks. In addition, if the values across the data blocks tend to grow or decline the problem of "holes" in the values ranges of the not-yet-scanned data blocks, may be mitigated. A hole refers to a range of values of the grouping attribute which are not part of any of the records of the not-yet-scanned data blocks, wherein the hole is within the overall range covered by the values of the grouping attribute in the not-yet-scanned data blocks.

According to one embodiment, the method further comprises creating sub scan lists of the scan list, wherein each sub scan list comprises predefined data blocks in their scan order prior, thereby splitting the execution plan into multiple sub plans for the respective sub scan lists, wherein the scanning of the data blocks and the processing of the query is performed serially on the sub scan lists. In other terms, the scan list may be divided into several sub scan lists that are processed one after another at least up to the grouping operator of the query. For each of these sub scan lists it is known which value ranges have been completely covered after the scan list has been processed (alternatively, the value ranges yet to come can be denoted as well). This information may be part of the execution plan. The respective groups can then be processed to completion. Then the next sub scan list is started etc. This effectively transforms the query execution plan into many sub-plans, one for every sub scan list. The grouping may not be computed separately for each sub scan list, but after the rows of each sub scan list have been processed the execution plan contains a directive to complete the finished rows that may come from other sub scan lists in order to completely cover a value range.

According to one embodiment, the method further comprises creating sub scan lists of the scan list, wherein each sub scan list comprises all the data blocks in their scan order prior to a scan position of the scan positions or all data blocks between two consecutive scan positions, thereby splitting the execution plan into multiple sub plans for the respective sub scan lists, wherein the scanning of the data blocks and the processing of the query is performed separately for each sub scan list of the sub scan lists in accordance with the sub plans. If the value ranges of the sub scan lists happen to be disjoint (as it is the case of this embodiment), then every scan sub list can be grouped independently and only the results are combined. For example, the scan list that comprise the following {b1, b2, b3, SP1, b4, b7 SP2, b5, b6, b8, b10 SP3 . . . }, may be split according to this embodiment into the following sub scan lists: sublist {b1, b2, b3}, sublist {b4, b7} and sublist {b5, b6, b8, b10}.

The sub scan lists indicate or transport the knowledge about the completed value ranges (or alternatively, the value ranges yet to come) to the grouping operator, so that it can act accordingly. These embodiments may thus speed up the grouping process by efficiently transmitting value range information to the grouping operator in contrast to an ad-hoc method that changes the input of the grouping operator after each time a scan position is reached in order to indicate the value range information. This may particularly be advantageous as there can be arbitrary numbers of processing operators in the operator graph between the scanning operator (which knows what data blocks are being scanned) and the grouping operator. These operators may eliminate, create new, or modify rows. The parallel processing may further speed up the grouping process. The sub scan lists may provide a way to notify the grouping operator of completed value ranges e.g. the last record processed of each sub scan list indicates the scan position.

According to one embodiment, the query involves further execution operators before a grouping operator performing the grouping, the method further comprising: associating metadata with the scanned records, wherein the metadata indicates the value ranges of the grouping attribute of the scanned records, updating the metadata by each of the execution operators in case the value ranges change, and using the metadata by the grouping operator for performing the aggregating and the flushing.

This may provide another way to notify the grouping operator of completed value ranges (or those yet to come) e.g. this may provide a way to notify or indicate the scan position. Depending on the processing model of the execution engine this can be done at various levels of granularity, e.g., meta-data associated with every row, every processing set of rows, or globally with the data table. Every execution operator in the execution plan updates the meta-data as corresponding rows are modified. This way, the meta-data is always up to date w. r. t. the state of the rows as seen by the next operator. Finally, the grouping operator receives and interprets the meta-data and is, thus, empowered to complete groups for which all rows have been received. For example, the query optimizer can generate the execution plan so that the meta-data is only created when there is a grouping operator further up in the execution plan. Alternatively, it can be always created and maintained.

According to one embodiment, the query comprises a grouping operator for performing the grouping. The method further comprises: indicating the scan position by inserting a token into the data stream formed by the scanned records, and using the token by the grouping operator for performing the aggregating and the flushing.

Data records when processed through the multiple operators of the execution plan (or of the query) may form a data stream that streams data between the working memories of consecutive operators of the query.

This is yet another way to inform the grouping operator of completed value ranges (or those yet to come) e.g. this may provide a way to notify or indicate the scan position. Whenever the scan has read a data block after which a value range has been fully covered, it inserts a special kind of record into the data stream that informs about the completed value ranges (or those ranges yet to come of the non-scanned data blocks). For example, the token may be a single byte identifier used to describe the data that follows it or data already processed. All unrelated operators in the execution plan (in the query) ignore these tokens and just pass them on. Finally, the grouping operator consumes these tokens and interprets them to finalize groups. Consuming the tokens removes them from the data stream. For example, the query optimizer can generate execution plans so that the tokens are only created when there is a grouping operator further up in the execution plan. Alternatively, they can be created always and are ignored by other operators and are finally consumed by the root node.

According to one embodiment, the scan order is obtained by sorting the data blocks in the scan list in ascending order by their minimum or descending order by their maximum. This may enable many groups to be completed as soon as possible, as the data blocks are scanned in a different order as defined in this embodiment. The rows themselves are not sorted or reordered. Only the data blocks are scanned in a different order. The rows within a data block remain in the order in which they happen to be.

This embodiment may enable an effective grouping, as the data blocks in the scan list are ordered ascending by their minimum or descending by their maximum. This guarantees that all values which are smaller than the minimum/larger than the maximum of any other data block x can be grouped completely before x is scanned.

According to one embodiment, the method further comprises creating partitions of data blocks based on the physical storage of the data blocks of the scan list, data blocks of each partition of the partitions having a distinct value range of the grouping attribute, thereby splitting the execution plan into multiple sub plans for the respective partitions, wherein the determining, scanning, and the processing of the query steps are performed separately for each partition of the partitions in accordance with the sub plans.

For example, the processing of each partition may require respective working memories. For example, each sub plan has a set of operators (the operators of the query), wherein each operator may be associated a working memory or buffer, resulting in a set of working memories. For multiple sub plans of the multiple partitions, multiple sets of working memories may be provided.

In contrast to searching for groups to complete as soon as this is possible, e.g., potentially right after every scanned data block (e.g. using a sorted scan list), this embodiment may enable that all groups created so far can be completed. This may allow to flush the entire grouping data structure instead of removing individual groups.

Grouping data structures may be created for saving the groups that are defined while processing data blocks. In case the completed groups have to be determined on the fly, the grouping data structures may have to be searched. This embodiment may avoid this as it may be capable of executing the entire grouping operation without having to search through the grouping data structures for groups that can be completed because the processing of all data blocks of a partition is an indication that the groups so far created are completed groups. Thus, this may save processing time. Having enough memory available to process all groups of one partition, disjoint value range partitions allow processing the present method efficiently.

According to one embodiment, the distinct value range of a partition of the partitions is defined by the smallest value and highest value of the grouping attribute of records stored in the partition. This may enable having sub-partitions of the defined partitions, by for example choosing a given value, independently of the edges of the data blocks, to be the extreme value of a partition. For example, a partition of the partition may be split into two sub-partitions. The two sub partitions may share data blocks. In this case, by comparing the value of the grouping attribute of each processed record with the edges of the sub partitions it may be determined to which sub-partition the record belongs. Each sub-partition may be processed as described with the partitions.

According to one embodiment, each of the determined distinct value ranges is defined by the smallest value and highest value of the grouping attribute of records of data blocks scanned before reaching the respective scan position. In another example, each of the determined distinct value ranges is defined by the smallest value and highest value of the grouping attribute of data blocks of the scan list. For example, the scan list comprises multiple scan positions SP1-SPN. The scan list may for example comprise the following {b1, b2, b3, SP1, b4, b7 SP2, b5, b6, b8, b10 SP3 . . . }. The first distinct value range is defined by the smallest value and highest value of the grouping attribute of records of data blocks b1-b3 (i.e. before SP1). The second distinct value range is defined by the smallest value and highest value of the grouping attribute of records of data blocks b4 and b7 (i.e. situated between SP1 and SP2) etc.

According to one embodiment, flushing the results comprises deleting the scanned records from a buffer associated with the grouping. This may further free up the working memory associated with the grouping operator.

The scan positions of the previous embodiments are referred to as first scan positions in the following embodiment. According to one embodiment, the method further comprises determining that processing of the query involves grouping of entries of the data table with respect to a second grouping attribute; determining a second set of distinct value ranges of the additional grouping attribute based on the scan order of the data blocks, each second distinct value range having an associated second scan position indicative of a data block in the scan order after which no further data entries involving attribute values of the second grouping attribute within the respective value range are encountered; wherein the reached scan position is the first encountered scan position of the first and second scan positions.

In other terms, as soon as the present method detects that a value range r for a grouping attribute c of the two grouping attributes has been completely processed, all groups (across all attributes) having a value for c within r can be completed. In addition, the system can look for completed value ranges in every grouping column for which attribute value information is available.

Figure 1:
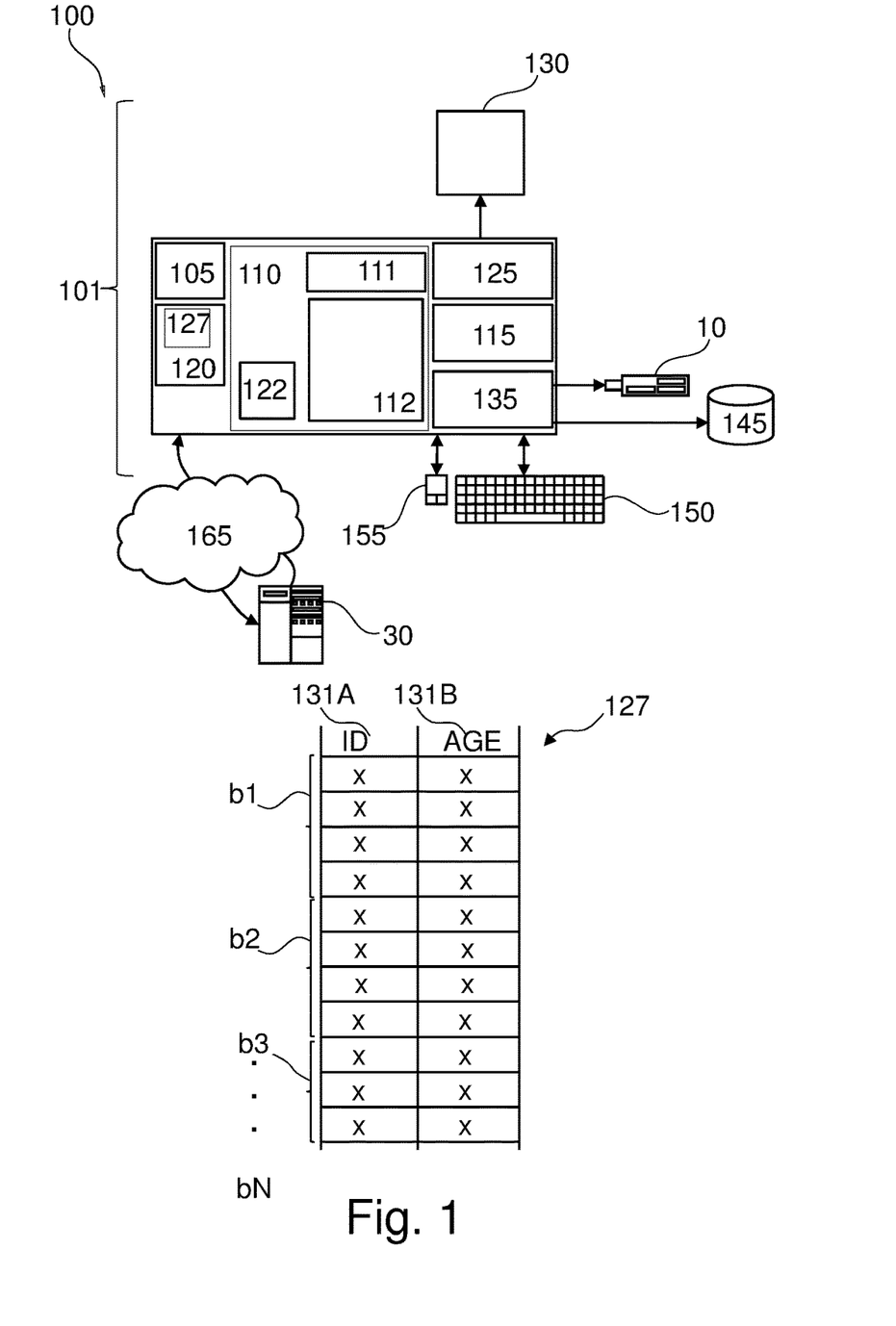
FIG. 1 represents a computerized system, suited for implementing one or more method steps as involved in the present disclosure.

FIG. 1 represents a general computerized system, suited for implementing method steps as involved in the disclosure.

It will be appreciated that the methods described herein are at least partly non-interactive, and automated by way of computerized systems, such as servers or embedded systems. In exemplary embodiments, though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions or software 112 e.g. instructions to manage databases such as a database management system.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 may comprise at least one data table (or data set) 127. For example, the software 112 may receive (automatically or upon request) as input the data table 127, or may download the data table 127 from storage 120 or memory 110.

The data table 127 may comprise one or more columns 131A-B, wherein each column is represented by a respective attribute (e.g. "ID" 131A and "Age" 131B). The rows or records of the data table 127 may comprise values of the attributes 131A-B. The data table 127 may for example comprise or may be stored on multiple (e.g. contiguous) data blocks b1-bN.

The term "data block" as used herein may refer to a logical or physical storage for storing the data of the data table. For example, a data block may be a physical storage unit or a fixed number of records.

For example, as illustrated in FIG. 1 the data table 127 may be divided or split or assigned to data blocks b1-bN using the number of rows in the data table 127.

In another example, the data table 127 may be split or divided based on storage size such that each data block b1-bN contains or is assigned to one or more storage units e.g. data pages. The term "storage unit" as used herein is intended to refer to the minimum addressable unit (e.g. by software 112) in order to store the data table 127. The size of a storage unit may be an integer multiple of the size of a disk unit. The size of the storage unit may be user defined. For example, each storage unit (e.g. data page) may correspond to a specific number of bytes of physical database space on disk (e.g., 4 KB). Other storage units having different granularities may be addressable or used in order to store data e.g. in the storage 120. For example, other storage levels may comprise containers and extents, wherein extents can be defined in term of number of data pages, while a container can be determined in term of number of extents.

The rows of each data block e.g. b1 of the data table 127 may be stored on contiguous, linked, or indexed disk units (e.g. of storage 120) that form the corresponding data pages of the data block b1. The term disk unit refers to the minimum addressable unit on storage 120. For example, a disk unit may have a size of 512 bytes. The data blocks b1-bN may or may not comprise the same number of data pages.

The term "data table" or data set as used herein refers to a collection of data that may be presented in tabular form. Each column in the data table may represent a particular variable or attribute. Each row in the data table may represent a given member, record, or entry of the data table.

Each data block b1-bN may be associated with attribute value information. For example, the attribute value information may be saved together with the data block to which it is associated (which is an indication that they both correspond to each other). In another example, the attribute value information may be stored (e.g. in a table) separately from the associated data block and having pointers/addresses or links to the associated data block.

While FIG. 1 only shows a few attributes and data blocks, it will be appreciated that numerous attributes and/or data blocks may exist or may be used.

Figure 2:
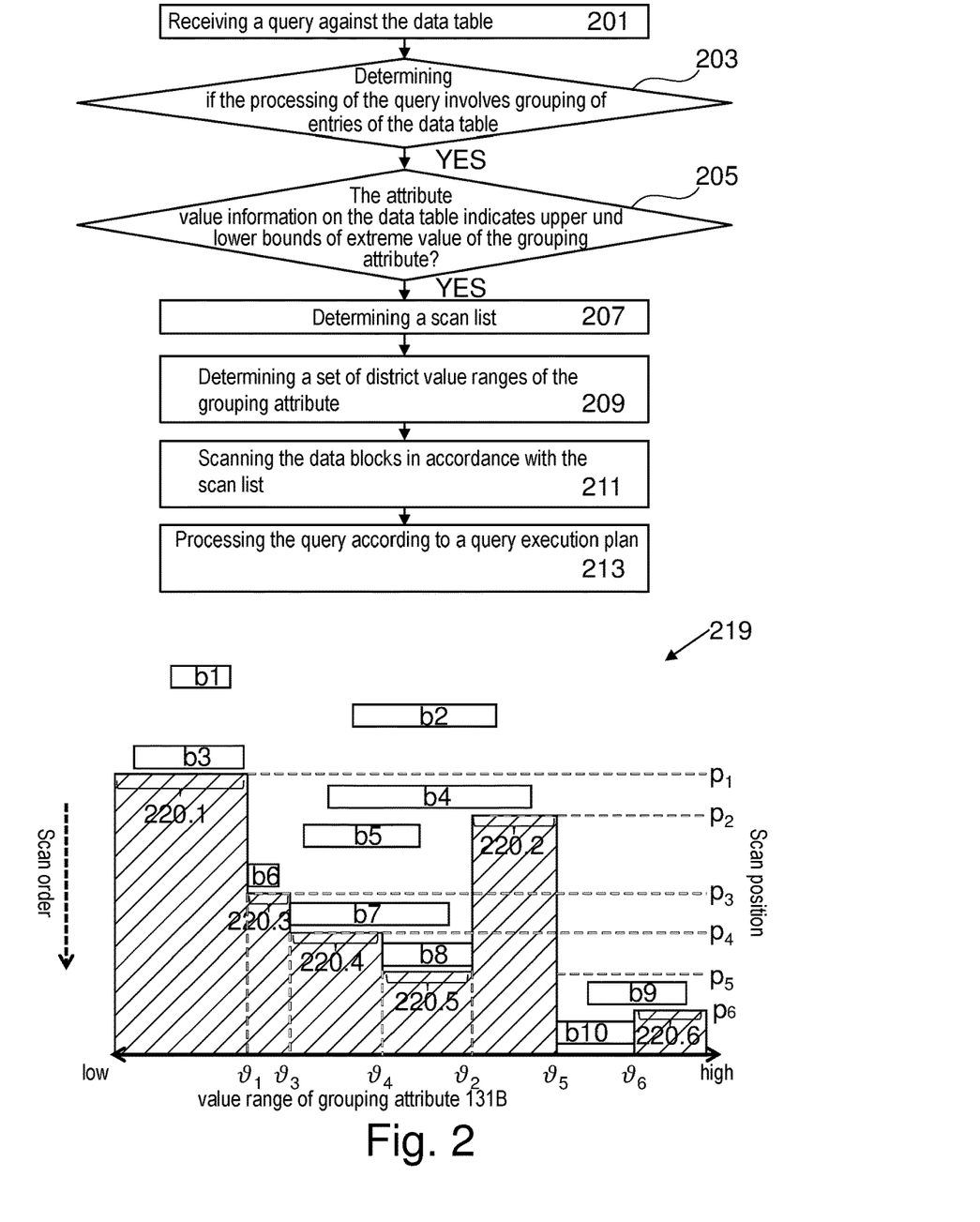
FIG. 2 is a flowchart of a method for grouping records of a data table.

FIG. 2 is a flowchart of a method for grouping (e.g. in a database management system) entries or records of a data table e.g. 127. Attribute value information reflecting upper and lower bounds of extreme values for at least one attribute of the data table 127 is provided. The at least one attribute may for example comprise attribute 131B.

The attribute value information may be descriptive of the attribute 131B. Using the attribute value information, a preselection of data blocks may be performed before scanning the preselected data blocks. The attribute value information may comprise information or metadata on the attribute 131B that allows such a preselection. In one example, the attribute value information may indicate at least one of the following: minimum attribute value of the attribute in the data block, maximum attribute value of the attribute of the data block. For example, the maximum and the minimum attribute values of the attribute define a first range of values of the attribute in a respective data block. For example, a received data query may require a second range of values of the attribute. The processing of the data query may comprise selecting data blocks of the data table whose respective first range overlaps with the second range and processing those selected data blocks (that forms a scan list).

The attribute value information once created at time t0 has the minimum and maximum values that reflect at time t0 the current minimum and maximum values; however, at time t1>t0 it may happen that changes occur (the changes comprise a deletion of one or more records from a data block) e.g. deletion of the record that has the maximum value. In this case, the minimum and maximum values determined at time t0 (and are part of the attribute value information) constitute a guaranteed lower and upper bound at time t1 and can still be used as described above.

In step 201, a query against the data table 127 may be received. The query may for example involve a grouping operation. Instead of looking at individual rows, the query may enable to group many rows together and compute an aggregate on the groups, such as in the following SQL query:

SELECT c.age, MEDIAN(c.price)
FROM customer c
GROUP BY c.age

The grouping may group records based on one or more attributes (e.g. c.age) and may involve an aggregate function such as the SUM, MEDIAN, COUNT, MIN, MAX, or AVG functions or a combination thereof to be applied on records of the groups. By grouping the customers by age, the final result computes the aggregates MEDIAN to determine the median of a series of prices which a customer of a particular age has spent. In this example, the aggregate requires the buffering of scanned records in order to do the aggregation.

In inquiry 203, it may be determined if the processing of the query involves grouping of entries of the data table 127 with respect to a grouping attribute.

For example, the determining of inquiry 203 may be performed by providing a reference pattern of a query. The query pattern may for example indicate a grouping operator such as "GOUP BY" and its arguments e.g. "c.age". The query received may be parsed into constituent parts such that the constituent parts may be compared with the reference pattern in order to determine that one or more constituent parts parsed from the query correspond to at least part of the reference pattern.

Using the above SQL query example, inquiry 203 may determine that the SQL query involves grouping of entries of data table "customer" (127) with respect to grouping attribute c.age (131B).

In response to determining that the processing of the query involves grouping of table entries, it may be determined (inquiry 205) whether the attribute value information on the data table 127 reflects or indicates upper and lower bounds of extreme values of the grouping attribute 131B.

If the attribute value information indicates upper and lower bounds of extreme values of the grouping attribute 131B, a scan list defining which data blocks of the data table are to be scanned and an associated scan order may be determined in step 207.

In one example, all data blocks of the data table 127 may be part of the defined scan list. In another example, part of the data blocks of the data table 127 may be part of the scan list. For example, that part of data blocks may satisfy a selection condition of the query or may satisfy a condition from other source technical requirements e.g. the system can process only a maximum number of data blocks and that maximum number of data blocks may be part of the scan list.

As shown in graph 219, and without loss of generality, data blocks b1-b10 of the data table 127 are to be scanned in the depicted order from top (b1) to bottom (b10). The depicted order indicates the scan order. The value range of grouping attribute 131B is represented horizontally, with smaller values located on the left and larger values on the right. The scanned rows are to be grouped by attribute 131B.

In step 209, a set of distinct value ranges 220.1-220.6 of the grouping attribute 131B may be determined based on the scan order of the data blocks b1-b10 and using the attribute value information. Each distinct value range 220.1-220.6 has an associated scan position p1-p6 indicative of a data block in the scan order after which no further data entries involving attribute values of the attribute 131B within the respective value range are encountered. For example, scan positions p1-p6 may indicate data blocks b3, b4, b6, b7, b8 and b9 respectively. For example, at scan position p2 the distinct value range 220.2 would comprise range [v2, v5]. At scan position p3 the distinct value range would comprise range [v1, v3].

For example, the distinct value range 220.1 is chosen because none of the data blocks b4-b10 has an attribute value of the attribute 131B that falls in that distinct value range 220.1. For example, b1 is not indicated by a scan position because b3 which is a next data block to be processed after data block b1 has values of the attribute 131B that completely falls in the range of values covered by the data block b1. Further details of steps 209-213 are provided with reference to FIG. 3.

A distinct value range of set of distinct value ranges 220.1-220.6 may be [Vmin, Vmax], where Vmin and Vmax are values of the grouping attribute that form the distinct value range. For example, for the distinct value range 220.1, Vmin is the smallest value of the overall range covered data blocks b1-b10, while Vmax is the smallest value of the data block b6. The smallest value of the of the overall range covered data blocks b1-b10 is not covered by a data record as that record may have been deleted after the attribute value information has been determined.

In another example, Vmin may be equal to the smallest value of the grouping attribute 131B of the records that have been so far processed for the distinct value range. Vmax may be equal to the largest value of the grouping attribute 131B of the records that have been so far processed for the distinct value range. in this case, Vmin for distinct value range 220.1 may be the smallest value of b3 and Vmax may be the highest value of b3.

In step 211, the data blocks b1-b10 may be scanned in accordance with the scan list and the scan order. For example, the data blocks b1-b10 may be scanned in accordance with the scan order and in accordance with the determined distinct value ranges. For example, the scanning may comprise scanning b1, b2 and b3 for the distinct value range 220.1 for reaching the scan position p1. The scanning of the data blocks b1-b3 that correspond to the distinct value range 220.1 may be performed independently of the scanning of the data blocks that correspond to the other distinct value ranges 220.2-6. For example, the scanning may comprise scanning b4, b5 and b6 for the distinct value range 220.2 for reaching the scan position p2. In another example, the scanning of the data blocks b1-b10 may be performed as described with reference to FIG. 3. The scanning may for example comprise retrieving or reading (e.g. from a hard disk storage) the records of the data blocks b1-b10 into a local memory storage (e.g. 110) which is the working memory associated with a scanning operator of the query that is used to perform the scanning.

In step 213, the query may be processed according to a query execution plan. The processing of the query comprises: in response to reaching an associated scan position: calculating aggregates on scanned records of the respective distinct value range (i.e. scanned records having values of the grouping attribute 131B within the respective distinct value range); and flushing results relating to the respective distinct value range to subsequent operators in the query execution plan. For example, in case of distinct value rang 220.1, the aggregates may be calculated for the scanned records comprising records of data blocks b1 and b3 (i.e. although records of data block b2 have been scanned they may not be used for the aggregates calculation for the range 220.1 because their grouping attribute values are not part of the range 220.1). Using the above SQL example, the aggregate "SUM" may be calculated for the scanned records that correspond to the distinct value range 220.1. The scanned records that correspond to the distinct value range 220.1 are all records of data blocks b1 and b3. The scanned records that correspond to the distinct value range 220.2 are records of the data block b4 that have values of the grouping attribute 131B between v2 and v5. This processing step may for example be performed independently for each of the distinct value ranges. In another example, the scanning of step 211 and processing of step 213 may be performed together independently for each distinct value range. The flushing may for example comprise deleting the processed groups and/or intermediate values stored in the working memory of the grouping operator. This may for example enable to free up the storage space by for example deleting the groups that have been processed so far e.g. the groups of records that correspond to data blocks b1 and b3 may be deleted after determination of the aggregates for range 220.1 as they may not be needed for the other distinct value ranges 220.2-6. The flushing may further comprise deleting the scanned records e.g. if the scanned records may not be needed by a subsequent operator of the query.

For example, if the scan list contains data blocks with unknown value range two ways may be used to deal with this: only start to use the present method once all data blocks with unknown value range have been read; or read the data blocks with unknown value range first. Then read the remaining values and process them using the present method.

Figure 3:
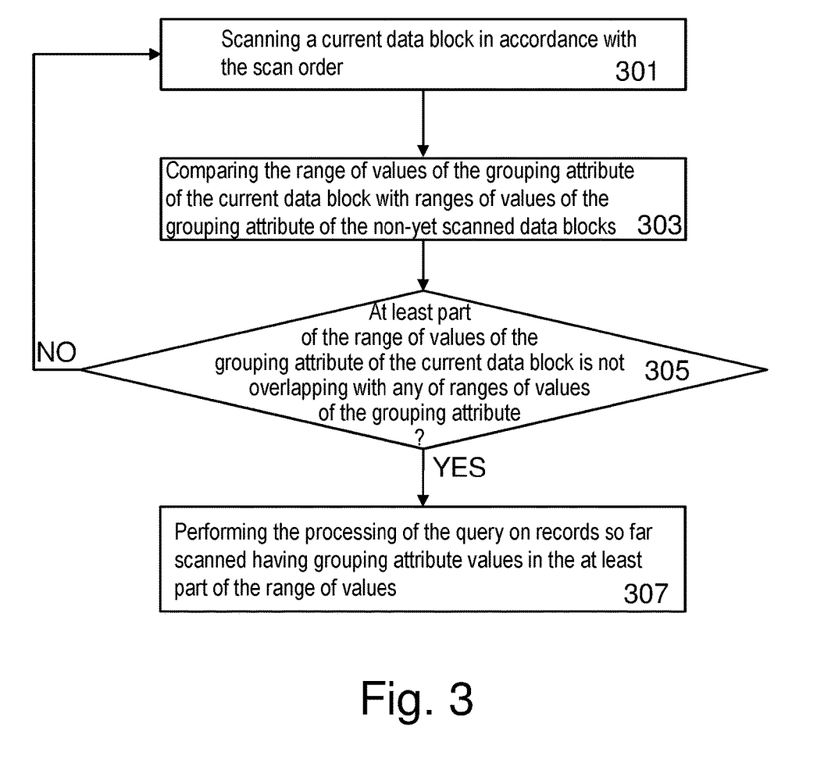
FIG. 3 is a flowchart of an iterative method for processing a query involving a grouping of entries of the data table.

FIG. 3 is a flowchart of an iterative method for processing a query involving a grouping of entries of the data table 127 further detailing steps 209-213.

In step 301, a current data block b1 may be scanned in accordance with the scan order as indicated in graph 219. For example, the scanning may start with data block b1.

In step 303, the range of values of the grouping attribute 131B of the current data block b1 is compared with ranges of values of the grouping attribute 131B of the not-yet-scanned data blocks b2-b10 of the scan list. This may for example be done by computing the range of possible values R yet to come, i. e., the smallest and largest value of the grouping attribute 131B in not-yet-scanned data blocks b2-b10 that will be scanned after the current data block b1. Thus, the minimum of all minima and the maximum of all maxima is computed respectively for data blocks b2-b10 in the remaining scan list using the attribute value information and compared with the range of values of the grouping attribute 131B of the current data block b1.

In case (inquiry 305) at least part of the range of values of the grouping attribute 131B of the current data block b1 is not overlapping with any of ranges of values of the grouping attribute 131B of the not-yet-scanned data blocks b2-b10 of the scan list, performing in step 307 the processing of the query on records (of data blocks of the scan list) so far scanned and that have grouping attribute values belonging to the at least part of the range of values. The at least part of the range of values of the grouping attribute 131B of the current data block b1 that is not overlapping with any of ranges of values of the grouping attribute 131B of the not-yet-scanned data blocks b2-b10 is the distinct value range associated with a scan position (e.g. p1). In other words, if the value range of data block b1 is covered by R then no groups can be finished yet. In the example of graph 219, until p1 the value ranges of b1 or b2 are still covered by the range of values yet to come. Thus, no groups can be completed after b1 or b2 has been scanned.

In case (inquiry 305) the range of values of the grouping attribute 131B of the current data block b1 is fully overlapping with range of values of the grouping attribute 131B of the non-scanned data blocks b2-b10 of the scan list repeating steps 301-307 for the next to-be processed data block b2 according to the scan order until all the data blocks b2-10 of the scan list are processed. In other words, if the value range of data block b1 is not at least partially covered by R then all groups for values outside of R can be completed. In the example of graph 219, the value range of b3, is not covered by the range of future values in the scan list, i. e., all groups having values of the grouping attribute 131B less than v1 can be flushed.

In this way, each distinct value range is determined dynamically (on the fly) and query processing is performed upon determining or identifying the distinct value range on scanned records of the distinct value range.

Figure 4:
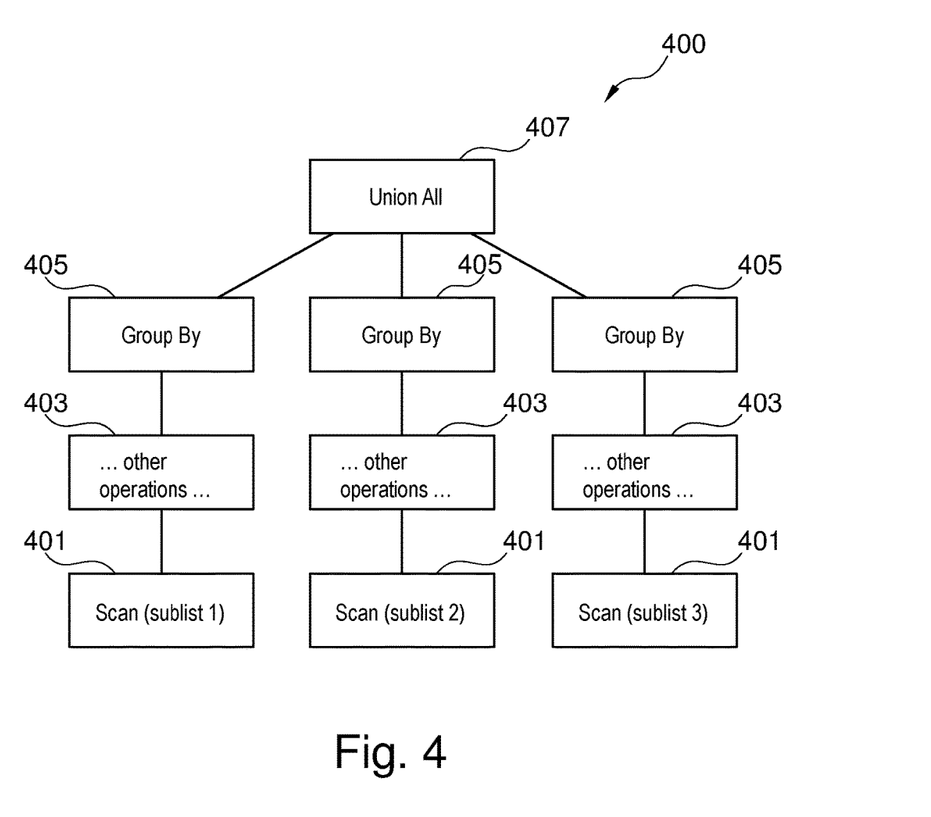
FIG. 4 illustrates an execution plan for a grouping on disjoint scan lists.

FIG. 4 illustrates an execution plan 400 for a grouping on three disjoint scan lists of data blocks of the data table 127. The execution plan 400 indicates that the grouping operator is applied after other operations have to be performed.

In this example of FIG. 4, three sub scan lists sublist1, sublist2 and sublist3 are used. Each sub scan list may comprise respective data blocks that are needed for performing an aggregate independently of the remaining data blocks. Using the example of graph 219, a sub scan list may for example comprise the data blocks b1, b2 and b3. In this way, the grouping operator of the query may know that upon scanning the last row of b3, the grouping operator may be applied.

Each sub scan list may be processed separately. As illustrated in FIG. 4, data blocks of each sub scan list are first scanned (401). After the scanning is performed other operations may be performed on scanned records (403). The grouping operator may then be executed (405) after the other operations have been performed. The results of grouping (e.g. buffered values or intermediated values that are stored in the working memory of the grouping operator) may be flushed and the results may be forwarded to a subsequent operator in the query execution plan, namely the UNION ALL operator (407).

The processing the sub scan lists may for example be performed in parallel using a multiprocessor system.

Figure 5:
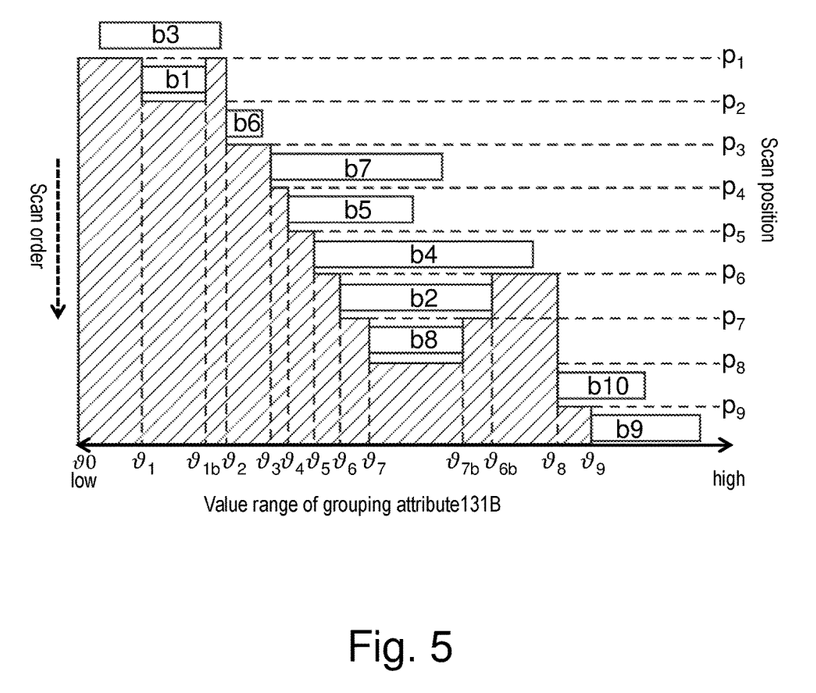
FIG. 5 illustrates the scan list with sorted data blocks.

FIG. 5 illustrates the scan list of FIG. 2 with the data blocks sorted in ascending order by minimum value in order to minimize the required working memory for grouping. By providing the scan order in accordance with the sorted order of the data blocks b1-b10, more scan positions p1-p9 have been identified meaning that less scanned records can be maintained in the working memory.

For example, before reaching the scan position p1 of FIG. 2 the working memory has to store all records of data blocks b1-b3, while in the present example of FIG. 4, before reaching scan position p1 only records data block b3 may temporarily reside in the working memory. For example, at scan position p1 the distinct value range would comprise [v0, v1] and [v1$b$, v2]. At scan position p2 the distinct value range would comprise [v1, v1$b$].

Figure 6:
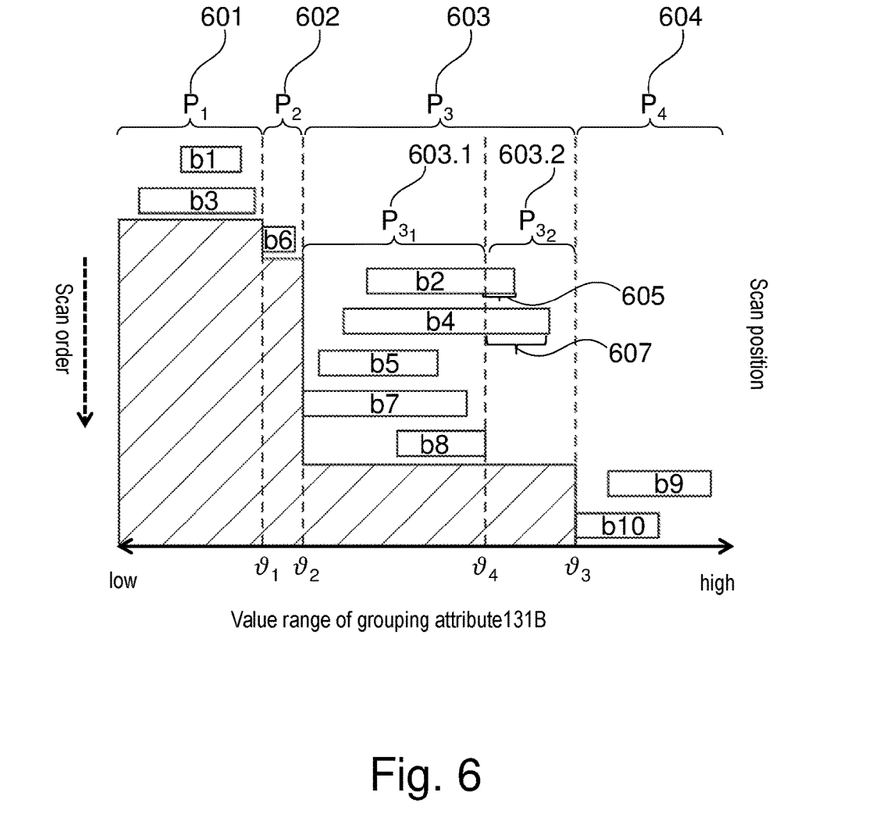
FIG. 6 illustrates the scan list with the data blocks divided into disjoint value range partitions.

Depending on the concrete data structure that is used to manage the groups in the grouping implementation it may be more or less efficient to locate the groups that belong to a particular value range. For example, a hash table may require to search through all groups linearly. For large numbers of groups this becomes a costly operation that doesn't improve if relatively few groups can be eliminated. In contrast to searching for groups to complete as soon as this is possible, i. e., potentially right after every scanned data block (e.g. using a sorted scan list), the present example may enable that all groups created so far can be completed. This may allow to flush the entire grouping data structure instead of removing individual groups. To achieve this, data blocks of a scan list may be distributed into partitions (e.g. disk partitions) with disjoint value ranges of the grouping attribute 131B. FIG. 6 illustrates this for the scan list of FIG. 2. FIG. 6 illustrates the scan list of FIG. 2 with the data blocks divided into disjoint value range partitions 601-604 in order to reduce the effort to find finished groups. Having enough memory available to process all groups of one partition, disjoint value range partitions 601-604 allow processing the present method efficiently.

In addition, disjoint value range partitions 601-604 may be processed with execution plans as exemplified in FIG. 4: Every partition is scanned, processed, and grouped separately. Only the results of the individual sub plans are combined by a UNION ALL operation. No further information needs to be passed on in order to signal that a particular value range is complete. All that is necessary is that the query optimizer generates an execution plan comprising the right scan lists.

For each partition 601-604 a scan list may be defined. The scan list of each partition may comprise data blocks (or an indication of a portion of one or more data blocks) of the partition and an associated scan order. For example, the scan list of partition 601 may comprise data blocks b1 and b3 and a scan order indicating b1 to be processed before b3.

Each scan list may be processed by scanning all records belonging to the scan list, processing the query on scanned records of the scan list. The processing of the query comprises: calculating aggregates on the scanned records; and flushing results relating to the respective distinct value range to subsequent operators in the query execution plan (e.g. to UNION ALL).

In one example, partitions that are too large can then be handled by, for example, sorting the data blocks of that partition and processing the sorted data blocks according to their sorted order. Alternatively, the records within such a large partition can be distributed into disjoint value range sub-partitions. In the example of FIG. 6, partition 603 may be assumed to be just a bit too large to keep all groups within the desired amount of working memory. For that, partition 603 may be subdivided into sub-partitions 603.1 and 603.2. For example, sub-partition 603.2 comprises records of the portions 605-607 of data blocks b2 and b4 and having a range [v4, v3]. The scanned values of data blocks b2 and b4 may be compared to v4 at query run time to determine their respective sub-partition. The values of each sub-partition are inserted into separate grouping data structures (e.g., hash tables). At the point when b4 has been completely scanned, the grouping data structure of sub-partition 603.2 may be finalized and its working memory can be reused. The grouping data structure of sub-partition 603.1, on the other hand, is kept until data block b8 is scanned. Assuming there is sufficient working memory for all grouping-relevant data of sub-partition 603.1, the system may now be capable of executing the entire grouping operation without having to search through the grouping data structures for groups that can be completed.

The sub-partitions 603.1 and 603.2 may be determined by identifying during the query planning process value ranges within the current partition that can be completed early using the methods described in FIG. 3. As long as all values of the partition fit in the available memory, more data blocks are added and adjacent completable value ranges are merged. When the point has come that adding a new data block to the currently considered subset of data blocks for the partition would exceed the available memory, the completable value range is selected which requires the largest amount of memory. The query plan is generated so that this value range is processed as a separate sub-partition. This process may be repeated several times, i. e., there may be several sub-partitions completed early. Moreover, sorting the data blocks within the current partition as described above may be exploited to save more memory due to larger completable value ranges and thus larger sub-partitions. Other approaches for calculating such a sub-partitioning might be implemented too. For example, the scan order might be modified to minimize the amount of partitions 601-604. This increases data locality by processing value ranges with many common values together which can be leveraged.

Hardware Optimization

Based on the current hardware configuration of the system implementing the present method, the query optimizer might choose between multiple execution plans that leverage certain properties of storage and/or processing units as described in the following.

Storage Optimization

The method of FIG. 2 or of FIG. 3 does not modify the scan list for a query. This property is particularly useful in case the data blocks of the scan list are stored in the same order on hard disks since it minimizes seek times that would be required for random access and, therefore, increase the total throughput for data transfers. In this method, the system merely exploits knowledge that was available through attribute value information anyways in order to narrow the remaining space for possible values in grouping attribute 131B and, therefore, determine which groups can be prematurely flushed.

Rearranging the scan list in an order other than the storage order might be more time consuming for storage media that is optimized for sequential access, but might have negligible negative impacts on devices which support random access well, such as solid state drives or (non-)volatile RAM. In this case, it might be beneficial to implement the out of order scan execution described by the embodiments involving partitions and sorting. Also in case of sequential storage media, rearranging scan lists to match storage order can be beneficial when the original scan list has a different order. This may require additional information about the actual order on the storage media.

Parallel Processing

If independent sub plans or partitions with disjoint value ranges have been identified, the system can process them independently as they do not need a common grouping operator. This data independence allows that the system processes all or some of the subplans/partitions in parallel, e.g., on different computing nodes, processors, CPU cores, FPGA pipelines, or other parallel devices. No synchronization may be needed between the partitions until the grouping has been completed and resulting rows need to be merged.

Cache Consciousness

Hardware cache sizes might be considered when a partitioning is calculated as described above. This allows to optimize memory access latencies within the grouping operator in case the required working memory for a partition is less than the cache size. This may particularly be useful in conjunction with parallel execution e.g., when available main memory sizes of multiple nodes or attached coprocessor devices and/or processor cache sizes are included when partitioning thresholds are computed.

In another example, a computer-implemented method for grouping entries of a data table in a database management system is provided. The data table is stored on multiple data blocks. The method comprises:

providing attribute value information on the data blocks, the attribute value information reflecting upper/lower bounds of extreme values for at least one attribute of the data table;

receiving a query against the data table;

determining that processing of the query involves grouping of entries of the data table with respect to a set of grouping attributes;

in response to determining that the processing of the query involves grouping of table entries, determining whether attribute value information on the data table reflects upper/lower bounds of extreme values of the set of grouping attributes;

if the attribute value information reflects upper/lower bounds of extreme values of at least one of the grouping attributes, determining a scan list defining which data blocks of the data table are to be scanned and an associated scan order;

based on the scan list and the upper/lower bounds of extreme values of the grouping attributes, determining a subset of the grouping attributes to be considered for flushing grouping results;

for each attribute in the subset, determining a set of distinct value ranges of the respective attribute, each distinct value range having an associated scan position after which no further data entries involving attribute values within the respective value range are encountered;

scanning the data blocks in accordance with the scan list and processing the query according to a query execution plan, wherein the processing of the query involves, in response to reaching an associated scan position, calculating aggregates on the respective distinct value range; and flushing results relating to the respective distinct value range to subsequent operators in the query execution plan.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for grouping records of a data table, the data table being stored on multiple data blocks, the method comprising:
providing attribute value information on the data blocks, the attribute value information indicating upper and lower bounds of extreme values for at least one attribute of the data table;
receiving, via a network interface card, a query against the data table;
determining that processing of the query involves grouping of the records of the data table with respect to a grouping attribute;
in response to determining that the processing of the query involves the grouping of the records, determining whether the attribute value information reflects the upper and lower bounds of the extreme values of the grouping attribute;

in response to determining that the attribute value information indicates the upper and lower bounds of the extreme values of the grouping attribute, determining a scan list defining which data blocks of the data table are to be scanned and determining an associated scan order;

determining a set of distinct value ranges of the grouping attribute based on the scan order of the data blocks, each distinct value range having an associated scan position indicative of a data block in the scan order after which no further data records involving attribute values of the grouping attribute within the respective value range are encountered; and scanning the data blocks in accordance with the scan list and processing the query according to a query execution plan, where the processing of the query involves, in response to reaching a scan position:

calculating aggregates on scanned records of the respective distinct value range associated with the scan position; and flushing results relating to the respective distinct value range to subsequent operators in the query execution plan.

2. The computer-implemented method of claim 1, where determining the set of distinct value ranges and scanning the data blocks comprises iteratively performing:

scanning a current data block in accordance with the scan order;

comparing the range of values of the grouping attribute of the current data block with ranges of values of the grouping attribute of not-yet-scanned data blocks of the scan list;

in response to determining that at least part of the range of values of the grouping attribute of the current data block is not overlapping with any of the ranges of values of the grouping attribute of the not-yet-scanned data blocks of the scan list, performing the processing of the query, where at least part of the range of values of the grouping attribute of the current data block is the distinct value range associated with the scan position.

3. The computer-implemented method of claim 2, where comparing the range of values comprises:

where the values ranges of the not-yet-scanned data blocks are increasing or decreasing value ranges in accordance with the scan order, comparing only a minimum value or a maximum value of the range of values of the grouping attribute of the not-yet-scanned data blocks of the scan list with the range of values of the grouping attribute of the current data block.

4. The computer-implemented method of claim 1, further comprising creating sub-scan lists of the scan list, where each sub-scan list comprises the data blocks in their scan order prior to a scan position of the scan positions or between two consecutive scan positions, thereby splitting the query execution plan into multiple sub-plans for the respective sub-scan lists, where scanning the data blocks and processing the query are performed separately for each sub-scan list of the sub-scan lists in accordance with the sub-plans.

5. The computer-implemented method of claim 1, where the query involves further execution operators before a grouping operator for performing the grouping, and further comprising:

associating metadata with the scanned records, where the metadata indicates the value ranges of the grouping attribute of the scanned records;

updating the metadata by each of the execution operators where the value ranges change; and using the metadata by the grouping operator for performing the calculating of the aggregates and the flushing.

6. The computer-implemented method of claim 1, where the query comprises a grouping operator for performing the grouping, and further comprising:

indicating the scan position by inserting a token into a data stream formed by the scanned records, and using the token by the grouping operator for performing the calculating of the aggregates and the flushing.

7. The computer-implemented method of claim 1, where the scan order is obtained by sorting the data blocks in the scan list in ascending order from a minimum value or descending order from a maximum value.

8. The computer-implemented method of claim 1, further comprising creating partitions of data blocks based on physical storage of the data blocks of the scan list, where data blocks of each partition of the partitions have a distinct value range of the grouping attribute, thereby splitting the query execution plan into multiple sub-plans for the respective partitions, and where determining, scanning, and processing the query are performed separately for each partition of the partitions in accordance with the sub-plans.

9. The computer-implemented method of claim 8, where the distinct value range of a partition of the partitions is defined by a smallest value and a highest value of the grouping attribute of records stored in the partition.

10. The computer-implemented method of claim 1, where each of the determined distinct value ranges is defined by a smallest value and a highest value of the grouping attribute of the records of the data blocks listed in the scan list before the respective scan position.

11. The computer-implemented method of claim 1, where flushing the results comprises deleting the scanned records from a buffer associated with the grouping.

12. The computer-implemented method of claim 1, where the scan positions are referred to as first scan positions, and further comprising:

determining that processing of the query involves grouping of entries of the data table with respect to a second grouping attribute;

determining a second set of distinct value ranges of the second grouping attribute based on the scan order of the data blocks, each second distinct value range having an associated second scan position indicative of the data block in the scan order after which no further data entries involving attribute values of the second grouping attribute within the respective value range are encountered; and where the reached scan position is a first encountered scan position of the first and second scan positions.

13. A computer program product for grouping records of a data table, the data table being stored on multiple data blocks, comprising a computer readable storage medium having computer readable program code embodied therewith, where the computer readable program code when executed on a computer causes the computer to:

provide attribute value information on the data blocks, the attribute value information indicating upper and lower bounds of extreme values for at least one attribute of the data table;

receive a query against the data table;

determine that processing of the query involves grouping of the records of the data table with respect to a grouping attribute;

in response to determining that the processing of the query involves the grouping of the records, determine whether the attribute value information reflects the upper and lower bounds of the extreme values of the grouping attribute;

in response to determining that the attribute value information indicates the upper and lower bounds of the extreme values of the grouping attribute, determine a scan list defining which data blocks of the data table are to be scanned and determine an associated scan order;

determine a set of distinct value ranges of the grouping attribute based on the scan order of the data blocks, each distinct value range having an associated scan position indicative of a data block in the scan order after which no further data records involving attribute values of the grouping attribute within the respective value range are encountered; and scan the data blocks in accordance with the scan list and process the query according to a query execution plan, where the processing of the query involves, in response to reaching a scan position:

calculating aggregates on scanned records of the respective distinct value range associated with the scan position; and     flushing results relating to the respective distinct value range to subsequent operators in the query execution plan.

14. A computer system for grouping records of a data table, comprising:

at least one memory that stores the data table on multiple data blocks;

a network interface card; and at least one processor programmed to:

provide attribute value information on the data blocks, the attribute value information indicating upper and lower bounds of extreme values for at least one attribute of the data table;

receive, via the network interface card, a query against the data table;

determine that processing of the query involves the grouping of the records of the data table with respect to a grouping attribute;

in response to determining that the processing of the query involves the grouping of the records, determine whether the attribute value information reflects the upper and lower bounds of the extreme values of the grouping attribute;

in response to determining that the attribute value information indicates the upper and lower bounds of the extreme values of the grouping attribute, determine a scan list defining which data blocks of the data table are to be scanned and determine an associated scan order;

determine a set of distinct value ranges of the grouping attribute based on the scan order of the data blocks, each distinct value range having an associated scan position indicative of a data block in the scan order after which no further data records involving attribute values of the grouping attribute within the respective value range are encountered; and     scan the data blocks in accordance with the scan list and process the query according to a query execution plan, where the processing of the query involves, in response to reaching a scan position:

calculating aggregates on scanned records of the respective distinct value range associated with the scan position; and         flushing results relating to the respective distinct value range to subsequent operators in the query execution plan.

\* \* \* \* \*